United States Patent
Chen et al.

(10) Patent No.: US 11,897,139 B2
(45) Date of Patent: Feb. 13, 2024

(54) DYNAMIC CONFIGURATION METHOD BASED ON ROLE ASSIGNATION AND MULTI-AGENT PLAN EXECUTION DEVICE

(71) Applicant: FAROBOT INC., New Taipei (TW)

(72) Inventors: Chia-Pang Chen, New Taipei (TW); Eduardo Munera Sanchez, Madrid (ES)

(73) Assignee: FAROBOT INC., New Taipei (TW)

( * ) Notice: Subject to any disclaimer, the term of this patent is extended or adjusted under 35 U.S.C. 154(b) by 549 days.

(21) Appl. No.: 17/162,932

(22) Filed: Jan. 29, 2021

(65) Prior Publication Data
US 2022/0241967 A1 Aug. 4, 2022

(51) Int. Cl.
*B25J 9/16* (2006.01)
*G06Q 10/0631* (2023.01)
*G06Q 50/04* (2012.01)

(52) U.S. Cl.
CPC ...... *B25J 9/1661* (2013.01); *G06Q 10/06313* (2013.01); *G06Q 50/04* (2013.01)

(58) Field of Classification Search
None
See application file for complete search history.

(56) References Cited

U.S. PATENT DOCUMENTS

| | | | |
|---|---|---|---|
| 2019/0389074 A1* | 12/2019 | High | B25J 19/023 |
| 2020/0016754 A1* | 1/2020 | Skubch | B25J 9/1682 |
| 2022/0147059 A1* | 5/2022 | Borne-Pons | G06Q 10/0631 |

FOREIGN PATENT DOCUMENTS

| | | |
|---|---|---|
| CN | 102033536 | 12/2012 |
| CN | 103587869 | 7/2015 |
| TW | 201341288 | 10/2013 |

* cited by examiner

*Primary Examiner* — Christian Chace
*Assistant Examiner* — Shayne M. Gilbertson
(74) *Attorney, Agent, or Firm* — ScienBiziP, P.C.

(57) ABSTRACT

A method for dynamically configuring tasks between a number of manufacturing robots is based on a mechanism for assigning roles for different manufacture requirements. The method includes activating from a library a plurality of roles based on a target manufacturing plan and selecting at least one candidate robot for each activated role based on a plurality of abilities required for each role. The method further assigns activated roles to at least one candidate robot and commands each robot to which one or more roles have been assigned to perform the behaviors corresponding to each activated role, the activated robot then reporting completion of task to their controller.

16 Claims, 6 Drawing Sheets

DYNAMIC CONFIGURATION METHOD BASED ON ROLE ASSIGNATION AND MULTI-AGENT PLAN EXECUTION DEVICE

FIELD

The subject matter herein generally relates to manufacturing, and more particularly to a multi-agent plan execution device implementing a dynamic configuration method based on role assignation.

BACKGROUND

Manufacturing factories should be able to adapt a flexible manufacturing requirement to meet constant changes of the market. In this context, production requirements are in constant change, thus it must be answered by adapting its operation. Re-configuring factory operations requires to execute tasks to comply with a production plan, and autonomous mobile robots need to be designed accordingly. Therefore, autonomous mobile robots cannot easily adapt to the changes in the manufacturing requirements, and its reconfiguration is also time-consuming.

BRIEF DESCRIPTION OF THE DRAWINGS

Implementations of the present disclosure will now be described, by way of embodiments, with reference to the attached figures.

DETAILED DESCRIPTION

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series and the like.

In general, the word "module" as used hereinafter refers to logic embodied in hardware or firmware, or to a collection of software instructions, written in a programming language such as, for example, Java, C, or assembly. One or more software instructions in the modules may be embedded in firmware such as in an erasable-programmable read-only memory (EPROM). It will be appreciated that the modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1:
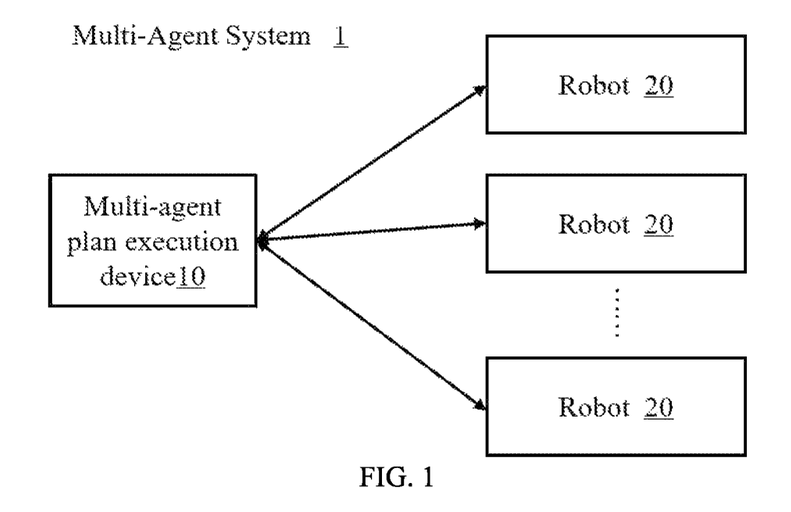
FIG. 1 is a schematic diagram of an application environment architecture of a dynamic configuration method based on role assignation of the present disclosure.

FIG. 1 is a schematic diagram of an application environment architecture of a dynamic configuration method based on role assignation of the present disclosure. The dynamic configuration method is applied in a Multi-Agent System (MAS) 1. The MAS 1 includes a multi-agent plan execution device 10 and several robots 20. The multi-agent plan execution device 10 communicates with the robots 20. In one embodiment, the multi-agent plan execution device 10 may be a Robot Control Server (RCS). The robot 20 may be an Autonomous Mobile Robot (AMR). It should be noted that there may be more than one multi-agent plan execution device 10 of the MAS 1.

Figure 2:
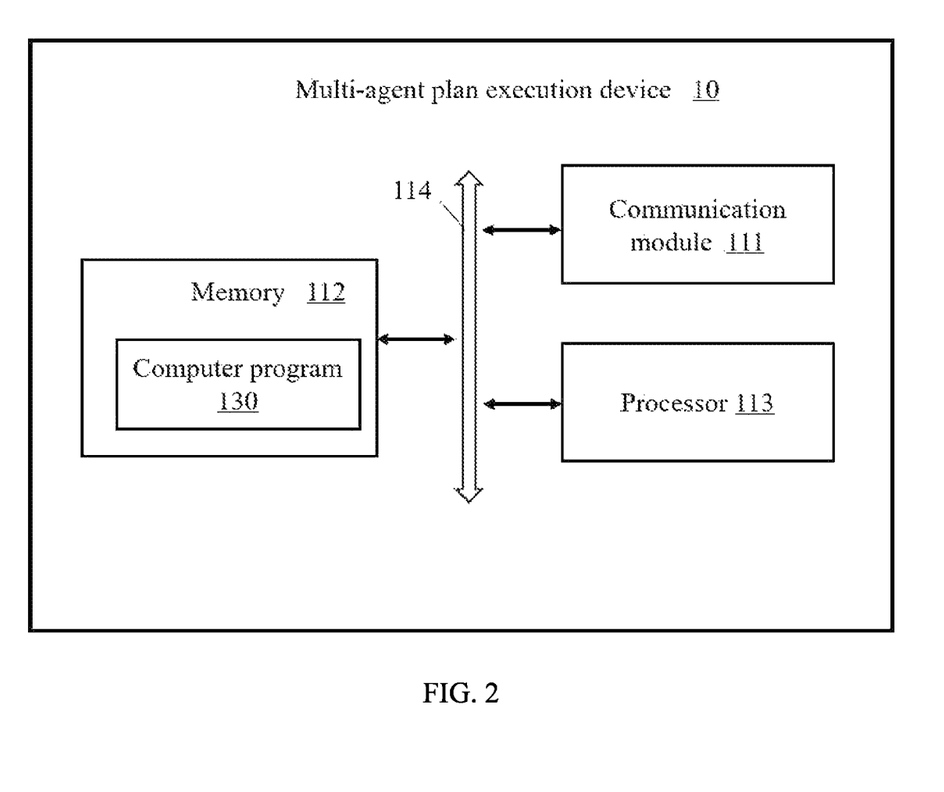
FIG. 2 is a block diagram of one embodiment of a multi-agent plan execution device employing the method of FIG. 1.

FIG. 2 is a block diagram of one embodiment of a multi-agent plan execution device of FIG. 1. The multi-agent plan execution device 10 includes, but is not limited to, a communication module 111, a memory 112, at least one processor 113, and at least one communication bus 114. The communication module 111, the memory 112, and the at least one processor 113 are electrically connected through the at least one communication bus 114.

In at least one embodiment, the communication module 111 can provide a network communication function for the multi-agent plan execution device 10 through a wired or wireless network transmission method. Therefore, the multi-agent plan execution device 10 communicates with the robot 20 over the network. The wired network can be any type of wired communication, such as the Internet and a local area network. The wireless network can be by radio, WI-FI, cellular, satellite, broadcast, Global System for Mobile Communications (GSM), General Packet Radio Service (GPRS), Code Division Multiple Access (CDMA), Wideband Code Division Multiple Access (W-CDMA), CDMA2000, IMT Single Carrier, Enhanced Data Rates for GSM Evolution (EDGE), Long-Term Evolution (LTE), advanced long-term evolution technology, time-division long-term evolution technology (Time-Division LTE, TD-LTE), fifth-generation mobile communication technology (5G) and other wireless communication technologies.

In at least one embodiment, the memory 112 is used to store a computer program 130 installed in the multi-agent plan execution device 10, for example, a program for dynamically configuring tasks based on a role assignation. In one embodiment, the memory 112 may be an internal storage unit of the multi-agent plan execution device 10. For example, it can be a hard disk or a memory of the multi-agent plan execution device 10. In other embodiments, the memory 112 may also be an external storage device of the multi-agent plan execution device 10, such as a plug-in hard disk equipped on the multi-agent plan execution device 10, a Smart Media Card (SMC), a Secure Digital (SD) Card, Flash Card, etc.

In at least one embodiment, the at least one processor 113 may be a central processing unit (Central Processing Unit, CPU), or a microprocessor or a data processing chip capable of performing control functions. The at least one processor 113 is used to execute software programs. For example, when the processor 113 executes the computer program 130, the steps in the embodiment of the dynamic configuration method based on the role assignment as described in FIG. 7 below are implemented. In at least one embodiment, the computer program 130 may be divided into one or more modules/units, and the one or more modules/units are stored in the memory 112 and executed by the at least one processor 113. The one or more modules/units may be a series of computer-readable instruction segments capable of completing specific functions, and the computer-readable instruction segments are used to describe the execution process of the computer program 130 in the multi-agent plan execution device 10.

Figure 3:
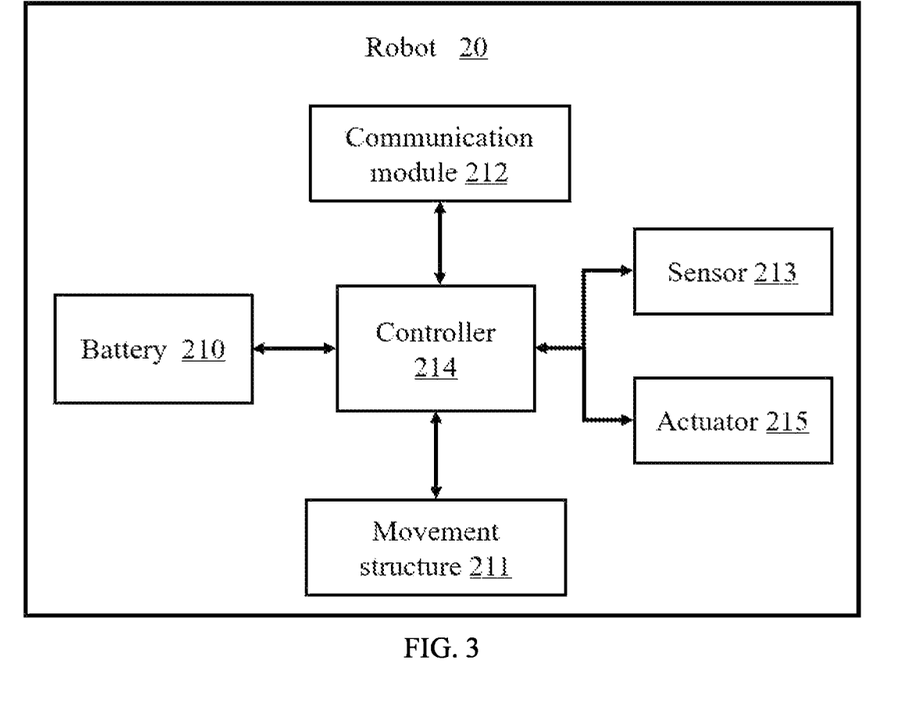
FIG. 3 is a block diagram of one embodiment of a robot utilized in the method of FIG. 1.

FIG. 3 is a block diagram of one embodiment of a robot of the method of FIG. 1. The robot 20 includes, but is not limited to, a battery 210, a movement structure 211, a communication module 212, a sensor 213, an actuator 215, and a controller 214. The battery 210, the movement structure 211, the communication module 212, the sensor 213, the actuator 215, and the controller 214 are electrically connected.

In at least one embodiment, the battery 210 provides power to the movement structure 211, the communication module 212, the sensor 213, the actuator 215, and the controller 214. The movement structure 211 controls the robot 20 to move. The movement structure 211 may be wheeled, tracked, on a mobile stand, legged, or any other mechanical structure. The communication module 212 provides a network connection between the robot 20 and the multi-agent plan execution device 10. The controller 214 is configured to receive role and task information assigned by the multi-agent plan execution device 10, and the controller 214 controls the robot 20 to perform the task according to the role and task information. The sensor 213 is configured to sense environmental information. For example, the sensor 213 may be a camera, a distance sensor, a laser scanner, etc. The actuator 215 is configured to operate on the environment. For example, a robotic arm, a lever, a conveyor, etc.

In at least one embodiment, the robot 20 may further include a charging unit (not shown), and the charging unit is used to provide power to the battery 210.

The present disclosure provides a role-based methodology to accurately model the production requirements and dynamically assign certain tasks to each robot (e.g., AMR) according to its capabilities. The present disclosure involves two distinct levels, an agent operation process and a plan execution process.

Figure 4:
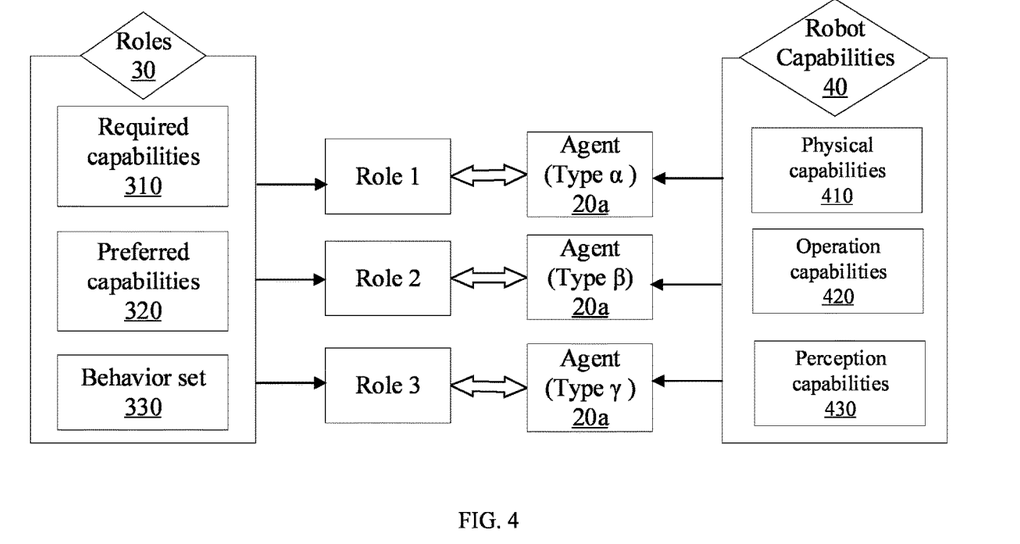
FIG. 4 is a schematic diagram of one embodiment of an agent operation process of the method of FIG. 1.

FIG. 4 is a schematic diagram of one embodiment of an agent operation process. In at least one embodiment, the agent operation process includes defining capabilities of each agent and assigning roles 30 to each agent 20a. A role 30 is an abstraction that describes a set of behaviors that must be fulfilled by an agent. Each agent 20a must assume a unique role 30 at one time. An agent 20a needs to be assigned to a role to execute a behavior. For example, as shown in FIG. 4, the role 30 includes required capabilities 310, preferred capabilities 320, and a set of behaviors 330.

In at least one embodiment, agents 20a have autonomy, ability to communicate, interactivity, reasoning ability, and planning ability, adaptability, etc. In one embodiment, the agents 20a are represented by any type of robot 20 which can execute a task. In a manufacturing context, agents 20a are represented by every available type of robot 20. The capabilities 40 of the agent 20a describe operating abilities and limitations of a specific agent 20a. For example, the capabilities of the agent 20a include several physical capabilities 410, several operation capabilities 420, and several perception capabilities 430. The physical capabilities 410 describe a degree or degrees to which an agent 20a can manage a physical task, such as, move payload, speed of displacement, ranges of actuators/top modules, etc. The operation capabilities 420 describe several tasks that can be executed by the agent 20a, such as, displacement, patrolling, picking item, dropping item, etc. The perception capabilities 430 describe an ability to interpret information of environment of the agent 20a, such as object recognition, ability to respond to Quick Response (QR) codes, or to Radio Frequency Identification (RFID) cards, etc.

In at least one embodiment, the agent 20a operation process describes assigning to different agent's roles taken from a role library (Roles Library), and the agents 20a performing behaviors corresponding to the role according to provided capabilities of the agents 20a. The provided capabilities of the agents 20a can constitute a Capabilities Library. When assigning roles, it is necessary to consider whether the required capabilities of the roles match the provided capabilities of the agent 20a.

Figure 5:
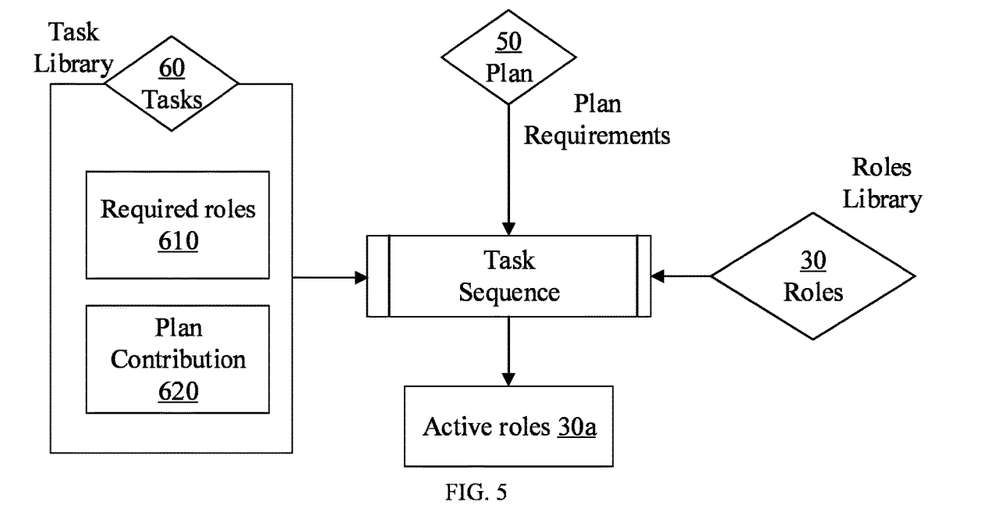
FIG. 5 is a schematic diagram of one embodiment of a plan execution process of the method of FIG. 1.

FIG. 5 is a schematic diagram of one embodiment of a plan 50 execution process. In at least one embodiment, the plan 50 includes a sequence of tasks 60, and each task includes one or several required roles 610 and a plan contribution 620. Each task has a corresponding priority. For example, in the manufacturing context, the plan 50 comprehends a prioritized set of operation requirements. The role requirements 610 are established according to a manufacturing goal. A Task defines commands that answer a specific requirement. The successful execution of the commands is defined as the plan contribution 620.

In at least one embodiment, the behaviors of the roles 30 describe actions to be performed by an agent 20a as behaviors 70. Behaviors 70 are designed to execute a task's operation command. An agent 20a can execute multiple behaviors 70 at the time if belong to the same role 30.

Figure 6:
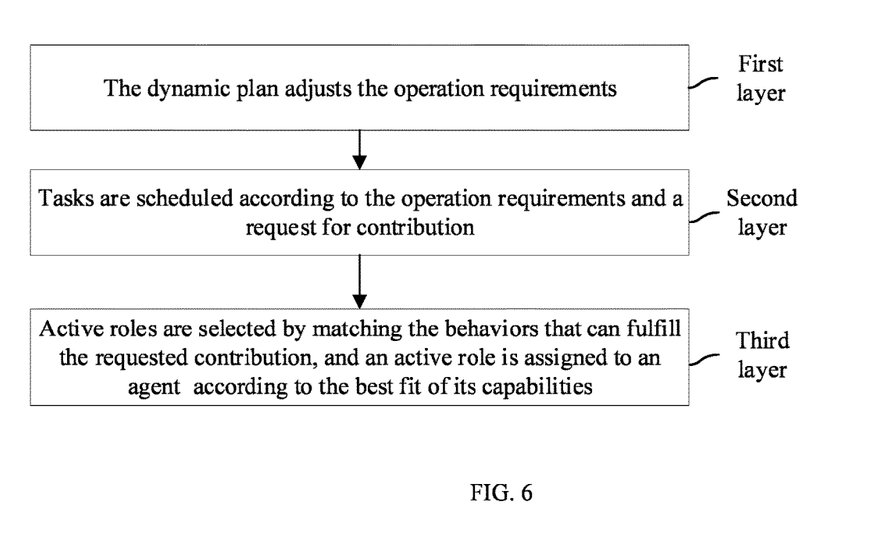
FIG. 6 is a schematic diagram of one embodiment of an execution flow of the method of FIG. 1.

Referring to FIG. 6, FIG. 6 is a schematic diagram of one embodiment of an execution flow of the method of FIG. 1. In at least embodiment, an execution flow of the method executes from a first layer to a second layer, and to a third layer. The first layer includes a dynamic plan 50, the second layer includes a sequence of tasks 60 of the dynamic plan, and the third layer includes several behaviors 70 of the sequence of tasks. In at least one embodiment, the dynamic plan 50 adjusts the operation requirements. Tasks 60 are scheduled according to the operation requirements and a request for contribution. Active roles 30a are selected by matching the behaviors 70 that can fulfill the requested contribution. An active role is assigned to an agent 20a according to the best fit of its capabilities 40. The execution flow guarantees that plan changes automatically readjust the request for contribution and increases the flexibility. The execution flow further guarantees that only roles 30 which can contribute to the plan 50 will be considered, so reducing the complexity. The execution flow further guarantees that agents 20a will distribute the task load according to their capabilities of contributing to the plan 50, so as to increase the optimization.

Figure 7:
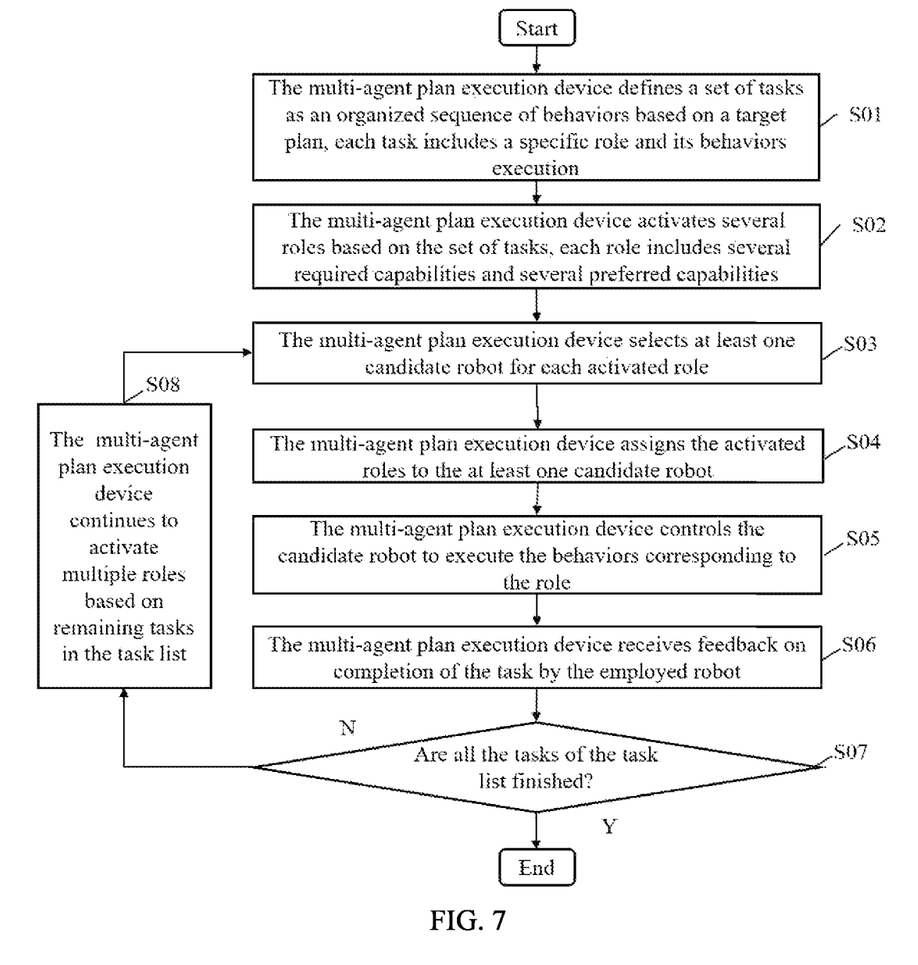
FIG. 7 is a flowchart of a dynamic configuration method based on role assignation of the present disclosure.

FIG. 7 illustrates a flowchart of a dynamic configuration method. The embodiment is provided by way of example, as there are a variety of ways to carry out the method. The method described below can be carried out using the configurations illustrated in FIGS. 1-6, for example, and various elements of these figures are referenced in explaining the embodiment. Each block shown in FIG. 7 represents one or more processes, methods, or subroutines carried out in the embodiment. Furthermore, the illustrated order of blocks is by example only, and the order of the blocks can be changed. Additional blocks can be added or fewer blocks can be utilized, without departing from this disclosure. The embodiment can begin at block S01.

At block S01, the multi-agent plan execution device 10 defines a set of tasks as an organized sequence of behaviors based on a target plan 50, each task includes a specific role and its behaviors execution.

In at least one embodiment, the target plan is a plan for manufacturing in a manufacturing context. For example, the target plan is to execute a predefined sequence of tasks, and the execution time needs to be minimized. The target plan includes a task list that needs to be executed, the task list includes multiple tasks. It should be noted that every task in the plan needs to be provided with a priority, and the priority is initially set as part of the plan. For example, as shown in table 1, the task list includes a Task 0, a Task 1, a Task 2, and a Task 3. A priority of the Task 0 is higher than the Task 1, the Task 2, and the Task 3, a priority of the Task 1 is higher than the Task 2, and the Task 3, and a priority of the Task 2 is higher than the Task 3. Then, when executing the target plan, it is necessary to execute the Task 0 first, then execute the Task 1, then execute the Task 2, and finally execute the Task 3.

TABLE 1

| Target Plan | |
|---|---|
| Objective | Execution time should be minimized (Generic sequence of operation tasks) |
| Prioritized task list | Task0 (T1) → Task1 (T3) → Task2 (T2) → Task3 (T2) |

In at least one embodiment, the tasks of the task list are of different types. For example, as shown in table 2, types of the task list can include T1, T2, and T3. In at least one embodiment, each task of the different types of tasks needs a required role. For example, in table 2 following, the required role of the T1 is R1, the required role of the T2 is R2, and the required role of the T3 is R3.

TABLE 2

| Tasks | | | |
|---|---|---|---|
| Type | T1 | T2 | T3 |
| Parameters | P1 | P2 | P3 |
| Required Role | R1 | R2 | R3 |

In at least one embodiment, a type of a role corresponds to the required role of the task. For example, the types of roles include R1, R2, and R3.

At block S02, the multi-agent plan execution device 10 activates several roles 30 based on the set of tasks, each role includes several required capabilities 310 and several preferred capabilities 320.

In at least one embodiment, the role includes required capabilities. A type of a role corresponds to required capabilities. For example, as shown in Table 3 the required capabilities of the type of R1 requires a physical capability "PhysicalC1" greater or equal than a value "x", an operation capability "OperationC1", and a perception capability "PerceptionC1". The required capabilities of the type of R2 requires a physical capability "PhysicalC1" greater or equal than a value "y", a physical capability "PhysicalC2" greater or equal than a value "v", an operation capability "OperationC1", and a perception capability "PerceptionC1". The required capabilities of the type of R3 requires a physical capability "PhysicalC1" greater or equal than a value "y", an operation capability "OperationC1", an operation capability "OperationC2", and a perception capability "PerceptionC1". Where the value of "x" is greater than "y", and the value "w" is greater than "v".

In at least one embodiment, the role further includes preferred capabilities. In this embodiment, the preferred capabilities include a "PhysicalC2". It should be noted that the preferred capabilities are not limited to a single capability and may also be other capabilities. For example, a sensing range of the sensor 213, perception accuracy, speed of interaction, etc.

In at least one embodiment, the role further includes a merit or scoring mechanism. The robots corresponding to different roles can be scored through the scoring mechanism. The scoring mechanism includes a scoring function. The scoring function may be the value of the "PhysicalC2" capability of the robot divided by the value of the preferred capability "PhysicalC2". The scoring function may also be different according to differences in the preferred capabilities of the role. The preferred capabilities and metrics of the scoring function can be defined according to the required use.

TABLE 3

| | Roles | | |
|---|---|---|---|
| Type | R1 | R2 | R3 |
| Required Capabilities | PhysicalC1 >= x OperationC1 PerceptionC1 | PhysicalC1 >= y PhysicalC2 >= v OperationC1 PerceptionC1 | PhysicCap1 >= y OperationC1 OperationC2 PerceptionC1 |
| Preferred Capabilities | PhysicalC2 = v | PhysicalC2 = w | PhysicalC2 = v |
| Score function | PhysicalC2 | PhysicalC2 | PhysicC2 |

In at least one embodiment, the multi-agent plan execution device 10 establishes a corresponding relationship between the role and the organized sequence of behaviors to be executed, and the required and preferred capabilities.

In at least one embodiment, an agent 20a is defined by its capabilities and must assume a role accordingly. The capabilities of the agent 20a include several physical capabilities, several operation capabilities, and several perception capabilities. An agent 20a corresponds to a robot 20 and needs certain actions to be performed by the robot 20. In this embodiment, the robot 20 is an AMR. For example, as in Table 4 following, types of the agent 20a include AMR type A, AMR type B, and AMR type C. For an AMR type A, its capabilities include, a "PhysicalC1" capability with a value of "x", a "PhysicalC2" capability with a value of "v", a "OperationC1" capability, and "PerceptionC1" capability. For an AMR type B, its capabilities include, a "PhysicalC1" capability with a value of "y", a "PhysicalC2" capability with a value of "w", a "OperationC1" capability, a "OperationC2" capability, and a "PerceptionC1" capability. For an AMR type C, its capabilities include, a "PhysicalC1" capability with a value of "y", a "PhysicalC2" capability with a value of "u", a "OperationC1" capability, and a "PerceptionC1" capability. Where the value "x" is greater than "y", the value "w" is greater than "v", and the value "v" is greater than "u".

TABLE 4

Agents & Capabilities

| Type | AMR type A | AMR type B | AMR type C |
|---|---|---|---|
| Physical capabilities | PhysicalC1 = x<br>PhysicalC2 = v | PhysicalC1 = y<br>PhysicalC2 = w | PhysicalC1 = y<br>PhysicalC2 = u |
| Operation Capabilities | OperationC1 | OperationC1<br>OperationC2 | OperationC1 |
| Perception Capabilities | PerceptionC1 | PerceptionC1 | PerceptionC1 |

In at least one embodiment, before the multi-agent plan execution device 10 activates several roles based on the set of tasks, the method further includes establishing a corresponding relationship between roles 30 and tasks 60. A task includes a specific role and its execution context. The execution context includes all the parameters needed for the role to be executed. For example, given a task that requires a transport role, the execution context can be an origin and a destination point of this specific transport tasks. The role 30 corresponds to a task 60, and, according to the role 30, the agent 20a must be able to execute the behaviors 70 related with the task 60.

In at least one embodiment, before the multi-agent plan execution device 10 actives several roles based on the set of tasks, the method further includes obtaining capabilities 40 of each robot 20. The capabilities 40 of each robot include physical capabilities 410, operation capabilities 420, and perception capabilities 430. In this embodiment, a robot 20 is an agent 20a.

At block S03, the multi-agent plan execution device 10 selects at least one candidate robot 20 for each activated role 30. In at least one embodiment, there may be one or more robots 20 which have capabilities 40 matching the required capabilities 310 of one or more of the roles 30. That is, one role may need to be suitable for multiple candidate robots 20, or there may be multiple roles 30 which one candidate robot 20 can carry out, or there may be one role 30 only fitting one candidate robot 20.

In at least one embodiment, tasks 60 are related to roles 30, and roles 30 are related to robots 20. Therefore, a priority of a task 60 does not affect directly the selection of a robot 20, but it does have indirect effect by triggering the assignation of roles 30. If only one robot 20 is available, the multi-agent plan execution device 10 will only activate the assignment of a single role 30 (even if other roles are still active). The role that will be activated depends on the priority of the tasks 60, and the activated role 30 will be assigned to the one available robot 20. Even if an available robot 20 is a good fit for two roles 30, only the role 30 related to the higher priority task 60 will be requested for assignation. If a specific use case does not need to make use of prioritization of tasks 60, the same priority can be assigned to every task 60.

In at least one embodiment, the dynamic configuration method further includes assigning a merit or score result to each candidate robot 20. The step of assigning a score to each candidate robot includes:

(1) obtaining a score based on the plurality of preferred capabilities 420 and the plurality of capabilities 40 of each robot 20. For example, the preferred capability 320 of the role 30 may be a displacement speed of 1 m/s, and the obtained capability 40 of the candidate robot 20 is a moving speed of 1 m/s. The moving speed of the candidate robot 20 is divided by the displacement speed of the role 30 to obtain the score. That is, the score result is 1 point in this case.

(2) assigning the score to each of several candidate robots 20. It should be noted that each robot 20 does not need to know its own score, but only needs to know its role 30.

At block S04, the multi-agent plan execution device 10 assigns the activated roles 30a to the at least one candidate robot 20.

In at least one embodiment, the multi-agent plan execution device 10 assigns several activated roles 30a to at least one candidate robot 20 includes: the multi-agent plan execution device 10 parses or traverses the several activated roles 30a and determines whether a first target role 30 of the several activated roles 30a appears to select a first candidate robot 20. If the multi-agent plan execution device 10 determines that the first target role 30 should select the first candidate robot 20, the multi-agent plan execution device 10 assigns the first target role 30 to the first candidate robot 20. If the multi-agent plan execution device 10 determines that the first target role 30 needs to select several first candidate robots 20, the multi-agent plan execution device 10 determines upon a first target candidate robot 20 with a first highest score of the several first candidate robots 20. The multi-agent plan execution device 10 continues to traverse the remaining activated roles 30a and determines whether a second target role 30 of the remaining activated roles 30a needs to select several second candidate robots 20 or otherwise. If the multi-agent plan execution device 10 determines that the second target role 30 needs to select several second candidate robots 20, the multi-agent plan execution device 10 determines a second target candidate robot 20 with a second highest score of the several second candidate robots 20. The multi-agent plan execution device 10 determines whether the first and second target candidate robots 20 are the same robot, and whether the first highest score is greater than the second highest score. If the multi-agent plan execution device 10 determines that the first and second target candidate robots are the same robot, and the first highest score is greater than the second highest score, the multi-agent plan execution device 10 assigns the first target role to the first target candidate robot 20. If the multi-agent plan execution device 10 determines that the first and second target candidate robots 20 are the same robot, and the first highest score is lower than the second highest score, the multi-agent plan execution device 10 assigns the second target role to the second target candidate robot 20.

In at least one embodiment, the multi-agent plan execution device 10 assigns the several activated roles 30a to at least one candidate robot 20 further includes: the multi-agent plan execution device 10 determines whether all the activated roles 30a are assigned. If the multi-agent plan execution device 10 determines that there are roles unassigned, repeat traverse several activated roles 30a to if the first and second target candidate robots 20 are the same robot, and the first highest score is less than the second highest score, the multi-agent plan execution device 10 assigns the second target role to the second target candidate robot 20 until all the activated roles 30a are assigned.

In at least one embodiment, if the multi-agent plan execution device 10 determines that the first and second target candidate robots are the same robot, and the highest score is in fact equal to the next highest score, the multi-agent plan execution device 10 randomly assigns either the first target role or the second target role to the first or second target candidate robot. For example, the multi-agent plan execution device 10 assigns the first target role to the first target candidate robot 20 or assigns the first target role to the second target candidate robot. Alternatively, the second target role can be assigned to the first target candidate robot or the second target role can be assigned to the second target candidate robot 20.

If the multi-agent plan execution device 10 determines that the first and second target candidate robots are different, the multi-agent plan execution device 10 assigns the first target role to the first target candidate robot and assigns the second target role to the second target candidate robot.

If there are multiple candidate robots with the same score among the multiple second candidate robots needing to be selected by the second target role, the multi-agent plan execution device 10 randomly assign the second target role to any one of the multiple candidate robots having the common score.

When a robot finishes the assigned task, it will request a new role 30. Such finished robot will then be assigned the highest priority task that such robot can execute according to its capabilities. In case of the same priorities, it will execute the most suitable task according to its preferred capabilities.

At block S05, the multi-agent plan execution device 10 controls the candidate robot to execute the behaviors corresponding to the role.

In at least one embodiment, after the task corresponding to the candidate robot is determined, the multi-agent plan execution device 10 sends task information to corresponding robot and sends to the robot a command instruction for executing behaviors of the task. For example, the multi-agent plan execution device 10 sends Task0 (T1) to the AMR A1, and sends a command instruction for performing the Task0 (T1) to the AMR A1, and executing behaviors of the Task0 (T1).

At block S06, the multi-agent plan execution device 10 receives feedback on completion of the task by the employed robot.

At block S07, the multi-agent plan execution device 10 determines whether all the tasks of the task list are finished. If the multi-agent plan execution device 10 determines that all the tasks of the task list are finished, the process ends. If the multi-agent plan execution device 10 determines that there are unfinished tasks of the task list, the process goes to block S08.

At block S08, the multi-agent plan execution device 10 continues to activate multiple roles based on remaining tasks in the task list, then the process goes to block S03.

In at least one embodiment, if the employed robot has completed the task, the robot sends feedback information to the multi-agent plan execution device 10, and the multi-agent plan execution device 10 continues to activate multiple roles based on the remaining tasks in the task list, the process then returns to step S03 to repeat the execution of the task. At least one candidate robot is selected based on the required abilities 310 of each activated role 30a, and the candidate robot or robots are commanded to execute the behaviors 70 corresponding to the assigned role until all tasks in the task list are completed. It should be noted that a robot implies the execution of the comprised behaviors and a finalization of the execution of the behavior sequence implies the finalization of the task related with the assigned role.

In order to further illustrate the present invention, a dynamic configuration method based on role assignment provided by the present invention is described in detail below with reference to the embodiments.

Embodiment 1

Given the following fleet of robots, that is, one AMR with Type A, named AMR A1, one AMR with Type B, named AMR B1, and one AMR with Type C, named AMR C1, the execution sequence will proceed as follows:

(a) The multi-agent plan execution device 10 activates the roles according to the task list of the plan as shown in the following Table 5. The activated roles include one role of R1, two roles of R2, and one role of R3.

TABLE 5

| Prioritized Task list | Task0 (T1) → Task1 (T3) → Task2 (T2) → Task3 (T2) |
|---|---|
| Active roles | 1 × R1 – 2 × R2 – 1 × R3 |

(b) The multi-agent plan execution device 10 selects which robots are suitable candidates for each activated role 30a. In the embodiment 1, the multi-agent plan execution device 10 selects candidate robots according the "required capabilities" 310 of the activated roles 30a, and assigns a score based on the "preferred capabilities" 320 of the activated roles 30a and generates the following Table 6. In the Table 6, the role of R1 is fitting for AMR A1, the role of R2 is fitting for AMR A1 or AMR B1, and the role of R3 is fitting for AMR B1 or AMR C1. According to Tables 3 and 4, a score of the R1 of AMR A1 is v/v points, a score of the R2 of AMR A1 is v/w points, a score of the R2 of AMR B1 is w/w points, a score of the R3 of AMR B1 is w/v points, and a score of the R3 of AMR C1 is u/v points. Where w is greater than v, and v is greater than u.

TABLE 6

| R1 | A1 (v/v) |
|---|---|
| R2 | A1 (v/w) – B1 (w/w) |
| R3 | B1 (w/v) – C1 (u/v) |

(c) the multi-agent plan execution device 10 assigns the activated roles 30a to each candidate robot. In at least one embodiment, the process of assigning activated roles to each candidate robot is according to sequence:

(c1): The activated roles matching only one suitable candidate robot will be directly assigned to that robot. For example, in the Table 6, the role of R1 has only one candidate robot AMR A1, so that an assignment of the Task0 (T1) of Table 5 is made to AMR A1.

(c2): Each remaining role will be assigned to the AMR with the higher score. For example, Task1 (T3) is corresponding to the activated role of R3, Maximum score is w/v points (AMR B1). Task2 (T2) is corresponding to the activated role of R2, Maximum score is w/w points (AMR B1). An assignation of the Task2 (T2) of Table 5 is therefore made to AMR B1.

(c3): Repeat previous steps (c1 and c2) until all the tasks are assigned. For example, the multi-agent plan execution device 10 assigns the Task1 (T3) of Table 5 to the AMR C1, as shown in the following Table 7.

TABLE 7

| AMR | Assigned Role and Task |
|---|---|
| A1 | Task0 (T1) |
| B1 | Task2 (T2) |
| C1 | Task1 (T3) |

(d) the multi-agent plan execution device 10 determines that Task3 (T2) of the task list is not finished, thus the multi-agent plan execution device 10 continues to activate one role of R2 based on remaining task (Task3 (T2)), as shown in the following Table 8, then the process returns to step (b). A new loop is repeated from step (b) to step (d).

TABLE 8

| Prioritized Task list | Task3 (T2) |
|---|---|
| Active roles | 1x R2 |

The role of R2 is fitting for AMR A1 or AMR B1. A score of the R2 of AMR A1 is v/w points, and a score of the R2 of AMR B1 is w/w points. An assignation of the Task3 (T2) of Table 8 is made to AMR B1. Then the tasks of Table 5 are all finished, and the sequence of the plan execution is shown in the following Table 9.

TABLE 9

| Plan Execution Sequence |
|---|
| Round 1 assignment: A1:Task0 + B1:Task2 + C1:Task1 |
| Round 2 assignment: B1:Task3 |

Embodiment 2

Supposing that there is another candidate robot identical to A1 named A2. The fleet of robots includes thus includes one AMR with Type A, named AMR A1, and one AMR with Type A, named AMR A2, one AMR with Type B, named AMR B1, and one AMR with Type C, named AMR C1. The AMR A2 is capable of executing the role R1. The plan of Embodiment 2 is the same as the plan of the Embodiment 1, so that the tasks are the same as those of Table 5.

In the embodiment 2, the multi-agent plan execution device 10 selects candidate robots according the "required capabilities" 310 of the activated roles 30a, and assigns a score based on the "preferred capabilities" 320 of the activated roles, to generate the following Table 10. The role of R1 is fitting for AMR A1 or AMR A2, the role of R2 is fitting for AMR A1, AMR A2 or AMR B1, and the role of R3 is fitting for AMR B1 or AMR C1. According to Tables 3 and 4, a score of the R1 of AMR A1 is v/v points, a score of the R1 of AMR A2 is also v/v points, a score of the R2 of AMR A1 is v/w points, a score of the R2 of AMR A2 is also v/w points, a score of the R2 of AMR B1 is w/w points, a score of the R3 of AMR B1 is w/v point, and a score of the R3 of AMR C1 is u/v points. Where w is greater than v, and v is greater than u.

TABLE 10

| R1 | A1 (v/v) – A2 (v/v) |
|---|---|
| R2 | A1 (v/w) – A2 (v/w) – B1 (w/w) |
| R3 | B1 (w/v) – C1 (u/v) |

Iteration 1:
(1): No role has single candidate.
(2): Each role will be assigned to the AMR with the higher score. For example, Task0 (T1) is corresponding to the activated role of R1, Maximum score is v/v (AMR A1& AMRA2). Task1 (T3) is corresponding to the activated role of R3, Maximum score is w/v points (AMR B1). Task2 (T2) is corresponding to the activated role of R2, Maximum score is w/w points (AMR B1). Task3 (T2) is corresponding to the activated role of R2, Maximum score is w/w points (AMR B1). As priority of Task2 (T2) is higher than priority of Task3 (T2), an assignation of the Task2 (T2) of Table 5 is made to AMR B1.

Iteration 2:
(1): No role has single candidate.
(2) Each role will be assigned to the AMR with the higher score. For example, Task0 (T1) is corresponding to the activated role of R1, Maximum score is v/v point (AMR A1& AMR A2). Task1 (T3) is corresponding to the activated role of R3, a score of the R3 of AMR C1 is u/v points. Task3 (T2) is corresponding to the activated role of R2, Maximum score is v/w point (AMR A1& AMR A2). An assignation of the Task0 (T1) of Table 5 is made to AMR A2. Since AMR A1 and AMR A2 are both equally suitable for executing Task0 (T1) the assignation will be made randomly. Then, an assignation of the Task3 (T2) of Table 5 is made to AMR A1.

Iteration 3
(1) the role of R3 has only one candidate robot AMR A1, so an assignation of the Task1 (T3) of Table 5 is made to AMR C1, as shown in the following Table 11.

TABLE 11

| AMR | Assigned Role and Task |
|---|---|
| A1 | Task3 (T2) |
| A2 | Task0 (T1) |
| B1 | Task2 (T2) |
| C1 | Task1 (T3) |

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims.

What is claimed is:
1. A multi-agent plan execution device comprising:
at least one processor; and
a memory configured to store at least one programs, which when executed by the processor, leads the at least one processor to:
define a set of tasks as an organized sequence of behaviors based on a target plan, each task comprises a specific role and its behaviors execution;
activate a plurality of roles based on the set of tasks, and each of the plurality of roles comprises a plurality of required capabilities and a plurality of preferred capabilities;
select at least one candidate robot for each activated role based on the plurality of required capabilities;
obtain a score based on the plurality of preferred capabilities and a plurality of capabilities of each robot;

traverse the activated roles;
in response to a first target role of the activated roles, select a plurality of first candidate robots;
determine a first target candidate robot with a first highest score of the plurality of first candidate robots;
continue to traverse all remaining activated roles;
in response to a second target role of the remaining activated roles, select a plurality of second candidate robots;
determine a second target candidate robot with a second highest score of the plurality of second candidate robots;
in response that the first target candidate robot and the second target candidate robot are the same robot, assign the first target role to the first target candidate robot if the first highest score is greater than the second highest score;
in response that the first target candidate robot and the second target candidate robot are the same robot, assign the second target role to the second target candidate robot if the first highest score is lower than the second highest score; and
control the assigned candidate robot to execute the behaviors corresponding to each activated role.

2. The multi-agent plan execution device of claim 1, wherein the operation of the at least one processor further comprises:
receiving feedback information on completion of the task by the assigned candidate robot;
determining whether all tasks of a task list of the target plan are finished;
in response that at least one remaining task is unfinished, continuing to activate a plurality of roles based on the at least one remaining task; and
repeating to execute select at least one candidate robot for each activated role, assigning the activated roles to the at least one candidate robot, and controlling the assigned candidate robot to execute the behaviors corresponding to each activated role, until all the tasks are finished.

3. The multi-agent plan execution device of claim 1, wherein the operation of the at least one processor further comprises:
establishing a corresponding relationship between the role and the task, and the task comprises a specific role and its execution context.

4. The multi-agent plan execution device of claim 1, wherein the operation of the at least one processor further comprises:
obtaining the plurality of capabilities of each robot, wherein the plurality of capabilities of each robot comprises a plurality of physical capabilities, a plurality of operation capabilities, and a plurality of perception capabilities.

5. The multi-agent plan execution device of claim 1, wherein assigning the activated roles to the at least one candidate robot further comprises:
in response that the first target candidate robot and the second target candidate robot are the same robot, and the first highest score is equal to the second highest score;
assigning the first target role to the first target candidate robot; or
assigning the first target role to the second target candidate robot; or
assigning the second target role to the first target candidate robot; or
assigning the second target role to the second target candidate robot.

6. The multi-agent plan execution device of claim 1, wherein assigning the activated roles to the at least one candidate robot further comprises:
in response that the first target candidate robot is different from the second target candidate robot;
assigning the first target role to the first target candidate robot; and
assigning the second target role to the second target candidate robot.

7. The multi-agent plan execution device of claim 1, wherein the operation of the at least one processor further comprises:
establishing a corresponding relationship between the role and the organized sequence of behaviors to be executed, and the required and preferred capabilities.

8. The multi-agent plan execution device of claim 7 to a robot implies the execution of the comprised behaviors;
a finalization of the execution of the behavior sequence implies the finalization of the task related with the assigned role.

9. A dynamic configuration method based on role assignation implemented in a multi-agent plan execution device, the method comprising:
defining a set of tasks as an organized sequence of behaviors based on a target plan, each task comprises a specific role and its behaviors execution context;
activating a plurality of roles based on the set of tasks, and each of the plurality of roles comprises a plurality of required capabilities and a plurality of preferred capabilities;
selecting at least one candidate robot for each activated role based on the plurality of required capabilities;
obtaining a score based on the plurality of preferred capabilities and a plurality of capabilities of each robot;
in response to a first target role of the activated roles, selecting a plurality of first candidate robots;
determining a first target candidate robot with a first highest score of the plurality of first candidate robots;
continuing to traverse all remaining activated roles;
in response to a second target role of the remaining activated roles, selecting a plurality of second candidate robots;
determining a second target candidate robot with a second highest score of the plurality of second candidate robots;
in response that the first target candidate robot and the second target candidate robot are the same robot, assigning the first target role to the first target candidate robot if the first highest score is greater than the second highest score;
in response that the first target candidate robot and the second target candidate robot are the same robot, assigning the second target role to the second target candidate robot if the first highest score is lower than the second highest score; and
controlling the assigned candidate robot to execute the behaviors corresponding to each activated role.

10. The dynamic configuration method of claim 9, wherein the method further comprises:
receiving feedback information on completion of the task by the assigned candidate robot;
determining whether all tasks of a task list of the target plan are finished;

in response that at least one remaining task is unfinished, continuing to activate a plurality of roles based on the at least one remaining task; and repeating to execute select at least one candidate robot for each activated role, assigning the activated roles to the at least one candidate robot, and controlling the assigned candidate robot to execute the behaviors corresponding to each activated role, until all the tasks are finished.

11. The dynamic configuration method of claim 9, wherein the method further comprises:

establishing a corresponding relationship between the role and the task, and the task comprises a specific role and its execution context.

12. The dynamic configuration method of claim 9, wherein the method further comprises:

obtaining the plurality of capabilities of each robot, wherein the plurality of capabilities of each robot comprises a plurality of physical capabilities, a plurality of operation capabilities, and a plurality of perception capabilities.

13. The dynamic configuration method of claim 9, wherein assigning the activated roles to the at least one candidate robot further comprises:

in response that the first target candidate robot and the second target candidate robot are the same robot, and the first highest score is equal to the second highest score;

assigning the first target role to the first target candidate robot; or assigning the first target role to the second target candidate robot; or assigning the second target role to the first target candidate robot; or assigning the second target role to the second target candidate robot.

14. The dynamic configuration method of claim 9, wherein assigning the activated roles to the at least one candidate robot further comprises:

in response that the first target candidate robot is different from the second target candidate robot;

assigning the first target role to the first target candidate robot; and assigning the second target role to the second target candidate robot.

15. The dynamic configuration method of claim 9, wherein the method further comprises:

establishing a corresponding relationship between the role and the organized sequence of behaviors to be executed, and the required and preferred capabilities.

16. The dynamic configuration method of claim 15, wherein the multi-agent plan execution device to a robot implies the execution of the comprised behaviors;

a finalization of the execution of the behavior sequence implies the finalization of the task related with the assigned role.

* * * * *